June 17, 1958     F. W. MARSH     2,839,073
VALVE FOR INFLATABLE ARTICLES
Filed March 21, 1956

*INVENTOR.*
FREDERICK W. MARSH
BY *Chapin & Neal*
ATTORNEYS

United States Patent Office 2,839,073
Patented June 17, 1958

2,839,073

VALVE FOR INFLATABLE ARTICLES

Frederick W. Marsh, Agawam, Mass., assignor to Kestral Corporation, Springfield, Mass., a corporation of Massachusetts Application March 21, 1956, Serial No. 573,037

7 Claims. (Cl. 137—232)

This invention relates to an improved valve structure for inflatable articles such as figure toys, beach balls, floats and other aquatic toys and devices formed of vinyl resin sheetings, rubber and similar materials.

It is highly desirable that valves for the above urposes shall present a substantially smooth outer surface, substantially continuous with that of the article which they serve, that they permit easy inflation by placing the lips to the valve opening and blowing, and that when so inflated the escape of air is prevented even under hard use of the article.

The last two characteristics are to a degree antagonistic since to assure a reliable closure against escape of the air within the article the force acting to maintain the valve closed must be substantial and the greater this closing force the more difficult inflation, in the manner described, becomes, since the closing force plus the increasing inflation pressure must in the usual construction be overcome to effect complete inflation.

It is an object of the present invention to provide a valve structure which presents a substantially smooth exterior, and one which during inflation presents a minimum of opposition to inflation but which, when inflation is completed, provides complete assurance against unintentional deflation.

A further object is to provide a valve meeting the above objectives which permits quick and easy deflation when it is desired to deflate the article.

An additional object is to provide a valve which precludes entrance of foreign matter, such as particles of sand, during use.

Other and further objects and advantages will be made apparent in the disclosure of the accompanying drawing and in the following specification and claims.

The above objectives are accomplished in accordance with the present objective by providing, as later more fully described, the article with an inwardly extending inflating tube which is provided at its inner end with a low resistance check valve, held closed only by the air pressure in the article and a releasable plug closure of high resistance at the outer end of the tube, together with means to limit or prevent asymmetrical distortion of the plug engaged end of the tube.

Figure 1:
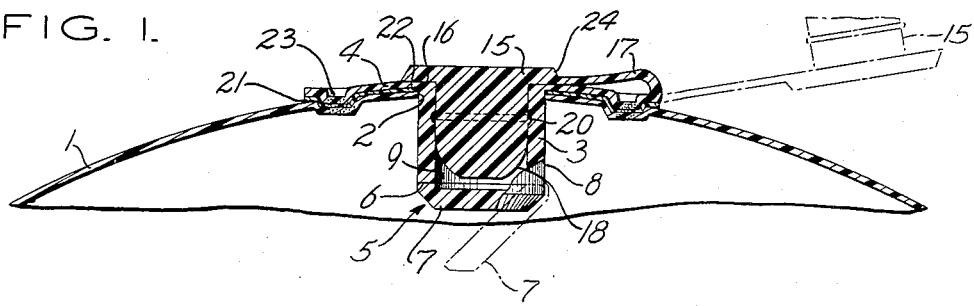
Fig. 1 is a fragmentary sectional view on an enlarged scale of an inflatable article provided with a construction embodying the invention.

Referring to Fig. 1 of the drawings a portion of the wall of an inflatable article is shown at 1 provided with an opening 2 through which a tube or tubular member 3 extends inwardly of the article, the outer end of the tube being provided with a radially outwardly extending flange 4 extending over the outer surface of the article surrounding and adjacent to the opening 2. The tubular member 3 with its flange 4 is preferably molded, as by injection molding, from a compressible plastic material such as a vinyl resin compound and as initially formed has its inner end closed, as indicated at 5, by an end wall which is thereafter partially severed from the body of the tubular member by a shearing cut 6 to form a flap 7 which acts as a check valve. By forming the flap by a shearing cut without the removal of any material, the movement of the flap to or from an open or closed position is minimized and the air pressure within the article acts uniformly over the surface of the flap to hold it in closed position.

Figure 4:
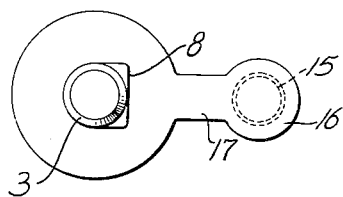
Fig. 4 is a bottom plan view of the element shown in Fig. 2.
Figure 5:
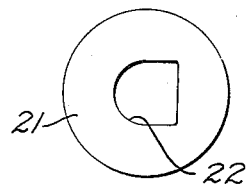
Fig. 5 is a top plan view of a second element of the valve construction of Fig. 1.
Figure 6:
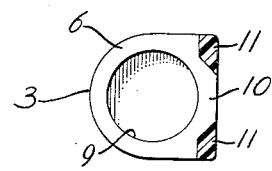
Fig. 6 is a sectional view substantially on line 6—6 of Fig. 3.

As best shown in Figs. 4 and 6 the tubular member is preferably formed with a flat outer face 8 along the side at which the hinge of flap 7 is formed. As best shown in Fig. 6 the cut 6 is carried completely across the air passage 9 of the tube, said passage preferably and as shown being circular in cross section. Preferably cut 6 is extended at 10 through the central portion of the face 8 to leave the valve flap 7 attached to the lower end of the tube only at the corner portions 11, thus providing a flap hinge of low resistance. By thus confining the connection of the flap 7 to the tube at the spaced corner portions 11, a hinge of low resistance but adequate strength is provided, at the same time that any tendency of the flap to twist in its plane out of register with the end of the tube is minimized or prevented.

A closure plug 15, having a flange 16 is connected to the flange 4 by a strap hinge 17. The free end of plug 15 is tapered as at 18 to facilitate its entrance into the outer end of passage 9 and the plug is cross-sectionally dimensioned to make a forced compressive fit in passage 9 to tightly close the latter against the maximum inflation pressure in the article. The diameter of flange 16 is preferably no greater than is necessary to guard against entrance of sand or other matter between the plug and the walls of the tube and to provide a gripping edge to facilitate removal of the plug from the tube. Preferably, plug 15 is formed with one or more circumferential sealing ribs, one being indicated at 19 (Fig. 3), to provide a localized zone of compression as indicated at 20 in Fig. 1 to further assure an air-tight sealing of the plug in passage 9.

As later described flange 4 is sealed to the wall 1 of the article around the opening 2. When the article is inflated the resulting radial tension transmitted to the outer end of the tubular member 3 from the tautly stretched wall of the article through flange 4 distorts and tends to enlarge the mouth of the tube causing leakage around the plug, this tendency to leakage being increased by the fact that in many inflatables this stretching tension, because of the form of the article, is not uniform, distorting the cross-sectional shape of the tube passage as well as enlarging it.

This tendency to leakage in a plug type closure is overcome and prevented in the structure of the present invention by providing means to prevent transverse tensional distortion of the tube at and adjacent its outer end. Preferably this means takes the form of a thin plate 21 substantially co-extensive with flange 4 and which, while flexible, is rigid and unyielding in the plane of the plate. The plate 21 is formed with a central opening 22 conforming to the outside cross-sectional shape of the tubular member 3 and so dimensioned that when the plate 21 is secured between flange 2 and wall 1 of the article with the tube 3 extending through opening 22, as shown in Fig. 1, the edge of the opening 22 snugly engages around, and buttresses the wall of the tubular member at the outer end portion thereof against cross-sectional distortion. Thus, the compressive sealing engagement of the plug in the mouth of the tube is enhanced and maintained. With the outer end of the tube thus held against distortion no distortional tension is transmitted to the portion of the tube below plate 21, and the inner portion of the plug and tube tightly and uniformly engage. The sealing rib 19 is located on plug 15 so as to position zone 20 inwardly of plate 21. It will be understood that, if desired, the plate 21 may be incorporated in flange 4 or secured to the outer face of flange 4 or to the inner face of the wall 1.

Advantageously plate 21 is formed of a vinyl resin composition, compounded to provide the desired rigidity, so that, as indicated at 23, Fig. 1, overlying portions of wall 1 of the article, plate 20 and flange 4 can be electronically welded each to the other around the tube 3. It will be understood, however, that the parts may be made of other materials having physical properties equivalent to those described and the parts secured together by cementing, vulcanizing or other suitable means.

In operation the plug 15 is swung back to the dotted line position of Fig. 1, the opening of tube 3 through flange 2 placed to the lips and the article inflated by blowing through the tube, flap 7 opening, as indicated in dotted lines in Fig. 1, to admit the air and closing under the pressure of the air in the article, between successive blowing operations, preferably the closing force exerted by the hinges 11 is not substantially greater than that necessary to bias the flap to or toward its closed position so that the opposition to inflation is not substantially or perceptibly greater than that of the air trapped in the article. While the pressure of the trapped air is sufficient to prevent substantial escape of air during the inflating process such closure pressure is not reliable, or in the present combination relied on, to keep the article inflated during use. Upon completion of the inflation, plug 15 is swung about hinge 17 and forced into the open end of passage 9 until rib 19 passes the opening in plate 21 and flange 16 lies snugly against flange 4. The passage of rib 19 past the portion of the tube buttressed by plate 21 is perceptibly felt, as the plug is pushed home, by a perceptible momentary increase and decrease in the resistance to the insertion of the plug and gives an indication that an adequate seal has been attained, but the pressure will, of course, be normally continued to bring the flanges 4 and 16 together as described. The edges of flange 16 are preferably tapered as indicated at 24 to give a smoother outer surface to the closed valve and for the same reason strap hinge 17 will be made as short as is consistent with proper seating of the plug in the open end of the tube. In preferred practice this will not appreciably exceed the difference in diameter between flanges 4 and 16.

In the combination of the invention, while the check valve formed by flap 7 operates at all times to prevent escape of the inflation pressures, the presence of distortion preventing plate 21 in cooperation with plug 15 provides the essential assurance against escape of the inflation pressure during use of the inflated article while flap 7 assures against escape of the air during inflation and permits easy and rapid inflation through a passage of relatively large cross-section opposed only by the air pressure in the article since the closing pressure of the flap hinge 11—11 can be minimized. Similarly the article can rapidly and easily be deflated, when plug 15 is removed, by holding the flap 7 open with a match, a small roll of paper or similar instrument.

Figure 2:
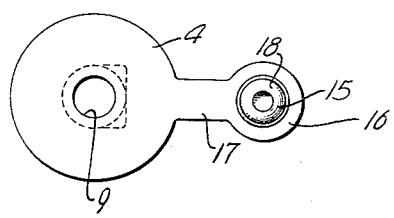
Fig. 2 is a top plan view, on a smaller scale, of one element of the valve construction of Fig. 1.
Figure 3:
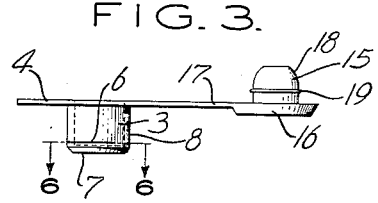
Fig. 3 is a side elevation of the element shown in Fig. 2.

It will further be apparent that the invention provides an economical valve construction from the point of view of manufacture since the members with the exception of plate 21 can be rapidly and cheaply produced by injection molding in one piece as shown in Figs. 2, 3 and 4, cuts 6 and 10 being made substantially simultaneously by a pointed blade, and plates 21 can be economically die cut from sheets.

By forming flap 7 by cuts without removal of material maximum security of closure of the tube during inflation is secured with a minimum of air pressure in the article.

It will be understood that while the structure as described is preferable, and is believed to exploit to the fullest the advantages of the combination, the low pressure check valve at the inner end of the inflation tube 3 may take various forms and that the invention is not limited in structural detail to the form illustrated.

What is claimed is:

1. A valve construction for inflatable articles comprising a tube formed of resilient plastic material and provided at one end with a radially outwardly extending flange substantially flush with said one end, and at the other end with a check valve opening under a relatively low oral pressure exerted through the flanged end of the tube, a plug closure making a releasable compression fit in the said one end portion of the tube under a pressure substantially in excess of the desired inflation pressure and means surrounding the plug engaged portion of the tube closely adjacent the flange to prevent cross-sectional distortion of that portion of the tube surrounded thereby, by reason of stress applied to the flange.

2. A valve construction for inflatable articles comprising a tube formed of resilient plastic material and provided at one end with a radially outwardly extending flange, the other end having an end portion closing that end of the tube, said portion being partially severed from the tube to form a flap opening under a pressure, exerted through the flanged end of the tube, not substantially in excess of the desired inflation pressure, a flanged plug, the flanges of the tube and plug being integrally connected by a strap hinge, the said flanges and strap hinge lying in a common plane with the tube and plug extending in opposite directions therefrom, said strap hinge being resiliently bendable to permit engagement of the plug in the flanged end of the tube, the plug and tube dimensioned to provide a forced compression-fit the one in the other, a plate provided with an opening conforming to the outer cross-section of the tube and through which the plug engaged portion of the tube extends, said plate being inextensible in the plane of the opening therethrough to prevent enlargement of the outside cross-sectional dimensions of the tube in the plane of the plate.

3. In a valve construction for inflatable articles a one piece valve unit formed of a resiliently compressible material such as vinyl resin compound and comprising a tube open at one end and provided at said end with a radially outwardly extending flange, the other end having an end portion closing the end of the tube, said portion being partially sheared from the member to form a flap, and a flanged plug, the flanges of the tube and plug being integrally connected by a strap hinge, the said flanges and strap hinge lying in a common plane with the tube and plug extending in opposite directions therefrom, said strap hinge being resiliently bendable to permit engagement of the plug in the open end of the tube, the plug and tube being dimensioned to provide a forced compression-fit the one in the other.

4. A structure as in claim 2, said plug being provided with a circumferentially projecting rib positioned to engage the inner wall of the tube inwardly of said plate.

5. A structure as in claim 2, the tube being flat along one side to provide spaced corners, the unsevered portion of the flap forming end of the tube being limited to said corners.

6. A structure as in claim 2, the flange of the tube being of greater diameter than the flange of the plug and the strap hinge connecting said flanges being not appreciably longer than the difference in diameter of said flanges.

7. A valve construction for inflatable articles comprising a member, formed of resilient plastic material, having an air passage extending therethrough and provided, at one end of said passage, with a radially outwardly extending flange substantially flush with said one end, and provided at the other end of said passage with a check valve closing the other end of the passage, said check valve opening under a relatively low oral pressure, exerted through the flanged end of the passage, and a plug integrally connected to said flange by a strap hinge, said flange and hinge lying in a common plane with the plug and passage extending in opposite directions from said plane, said hinge being resiliently bendable to permit engagement of the plug in the passage to close the latter, the plug and passage being dimensioned to provide a releasable forced compression-fit the one in the other under a pressure substantially in excess of the desired inflation pressure, and a plate positioned parallel to and closely adjacent said flange, said plate having an opening through which said passage and plug extends, when the plug is in passage closing position, said plate being inextensible in the plane of said opening to prevent cross-sectional distortion of that portion of the passage surrounded by the plate, by reason of stresses applied to the flange.

References Cited in the file of this patent

UNITED STATES PATENTS

| | | |
|---|---|---|
| 1,315,955 | Gill | Sept. 16, 1919 |
| 2,183,900 | Voit | Dec. 19, 1939 |
| 2,378,613 | Young | June 19, 1945 |
| 2,512,694 | Stout | June 27, 1950 |
| 2,679,857 | Russell | June 1, 1954 |
| 2,789,577 | Hasking | Apr. 23, 1957 |

FOREIGN PATENTS

| | | |
|---|---|---|
| 48,883 | France | June 14, 1938 |